(12) United States Patent
Suzuki et al.

(10) Patent No.: US 6,965,417 B2
(45) Date of Patent: Nov. 15, 2005

(54) SIGNAL PROCESSOR

(75) Inventors: Hidetoshi Suzuki, Takatsuki (JP);
Katsuya Ishikawa, Takatsuki (JP);
Keiichi Ito, Moriguchi (JP); Hisao Kunitani, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 644 days.

(21) Appl. No.: 10/169,555

(22) PCT Filed: Jan. 12, 2001

(86) PCT No.: PCT/JP01/00124

§ 371 (c)(1),
(2), (4) Date: Aug. 7, 2002

(87) PCT Pub. No.: WO01/52232

PCT Pub. Date: Jul. 19, 2001

(65) Prior Publication Data

US 2003/0020837 A1    Jan. 30, 2003

(30) Foreign Application Priority Data

Jan. 14, 2000    (JP) .............................. 2000-005504

(51) Int. Cl.$^7$ .............................................. H04N 5/57
(52) U.S. Cl. ...................................... 348/687; 348/691
(58) Field of Search .............................. 348/687, 688, 348/689, 691, 673, 677; 345/77, 20, 63; H04N 5/57

(56) References Cited

U.S. PATENT DOCUMENTS

| 4,792,733 A | * | 12/1988 | Redfern | 315/386 |
| 5,734,362 A | * | 3/1998 | Eglit | 345/89 |
| 5,861,926 A | | 1/1999 | Kwon | 348/687 |

FOREIGN PATENT DOCUMENTS

| JP | 3-1229997 | 12/1991 |
| JP | 06311462 | 11/1994 |
| JP | 06194450 | 7/1996 |
| JP | 08190362 | 7/1996 |

* cited by examiner

Primary Examiner—Michael H. Lee
(74) Attorney, Agent, or Firm—Steptoe & Johnson LLP

(57) ABSTRACT

An object of the present invention is to provide a signal processor which improves the offset accuracy of a video signal without increasing the number of bits of a circuit.

An N-bit adder (103) adds a video signal (S101) and an upper-N-bit signal of a brightness control signal (S102) as an offset value. A 1-bit pulse generator (107) generates a 1-bit pulse signal (S107) in which "1" and "0" have equal chances of appearing at random. A selector (106) selects the 1-bit pulse signal (S107) when the LSB of the brightness control signal (S102) is "1", while selects a ground level "0" when the LSB is "0", and supplies the selected signal to a carry input of the N-bit adder (103).

6 Claims, 6 Drawing Sheets

SIGNAL PROCESSOR

TECHNICAL FIELD

The present invention relates to a signal processor and, more particularly, to a signal processor which performs brightness adjustment of video signals.

BACKGROUND ART

Brightness adjustment of a video signal in a TV receiver or the like is performed by adding/subtracting an offset signal to/from the video signal.

FIG. 7 is a block diagram illustrating the construction of a conventional signal processor.

In FIG. 7, the conventional signal processor comprises an N-bit adder 1003 and a controller 1004.

The N-bit adder 1003 adds an N-bit video signal S1001 inputted to a video signal input terminal 1001 and an N-bit brightness control signal S1002 inputted to a brightness control signal input terminal 1002, and outputs the addition result from an output 1003D as an N-bit signal S1003. When overflow occurs, the N-bit adder 1003 outputs an overflown 1-bit signal, that is, a signal of the most significant bit of the N+1 bits as the addition result, from a carry output 1003E as a carry output signal S1004, and outputs a signal of the lower N bits from the output 1003D as the N-bit signal S1003. Here, a carry input 1003C of the N-bit adder 1003 is grounded.

The controller 1004 receives the carry output signal S1004 and the N-bit signal S1003 from the N-bit adder 1003 as input, controls the signals from the N-bit adder 1003 so that they are equal to or smaller than a predetermined upper limit and equal to or larger than a predetermined lower limit, and outputs an N-bit signal to a video signal output terminal 1005.

Next, the operation of the conventional signal processor will be described.

The N-bit video signal S1001 is supplied from the video signal input terminal 1001 to one input 1003A of the N-bit adder 1003. The N-bit brightness control signal S1002 is supplied from the brightness control signal input terminal 1002 to the other input 1003B of the N-bit adder 1003. As the result, a signal obtained by adding the brightness control signal S1002 to the video signal S1001 is outputted from the output 1003D and the carry output 1003E of the N-bit adder.

The N-bit signal S1003 and the carry output signal S1004 which are outputted from the N-bit adder 1003 are controlled by the controller 1004 so that they are within a range between predetermined values.

In this way, only an offset-adjusted video signal which is obtained by performing offset adjustment on the video signal S1001 is outputted from the video signal output terminal 1005.

However, in the conventional signal processor as described above, the accuracy of offset adjustment is restricted by the number of bits of the video signal and the brightness control signal. That is, offset adjustment of N-bit accuracy is performed in the conventional signal processor.

Thus, in order to improve the accuracy of brightness adjustment, the number of bits of the video signal and the brightness control signal is required to be increased.

However, when the number of bits is increased, it is required to increase the number of bits not only in the N-bit adder and the controller but also a circuit for processing a signal after offset adjustment, resulting in an increase in circuit scale.

The present invention is made to solve the above-described problems and has for its object to provide a signal processor which is able to improve the accuracy of brightness adjustment without increasing circuit scale.

DISCLOSURE OF THE INVENTION

According to Claim 1 of the present invention, there is provided a signal processor comprising: a pulse generator for generating a 1-bit pulse signal having an average logical value of "½"; a selector for selecting either the pulse signal or a signal having a logical value of "0" on the basis of a least-significant-bit signal of an N+1-bit (N is an integral number equal to or larger than "1") brightness control signal; and an N-bit adder for adding an N-bit video signal, an upper-N-bit signal of the N+1-bit brightness control signal, and the signal selected by the selector.

According to the present invention, the N-bit adder adds an N-bit video signal, an upper-N-bit signal of an N+1-bit brightness control signal, and a signal obtained by multiplying the least significant bit of the brightness control signal by ½, which is inputted as carry input, thereby performing brightness adjustment on the N-bit video signal with the accuracy for N+1 bits, without increasing circuit scale.

According to Claim 2 of the present invention, in the signal processor as defined in Claim 1, the pulse generator comprises: plural counters each of which counts the number of pulses of a periodic signal, and outputs the least significant bit of the counting result; and a single or plural exclusive OR gates which obtain exclusive OR between the outputs of the plural counters to output as a 1-bit pulse signal.

According to the present invention, in addition to the same effect as achieved by the invention according to Claim 1, a 1-bit irregular pulse can be generated by simple construction. Further, a pulse signal which has increased random property of a periodic signal is generated by the plural counters and a single or plural exclusive OR gates, thereby preventing a patterned picture or the like which could be generated when a regular pulse signal is employed.

According to Claim 3 of the present invention, in the signal processor as defined in Claim 1, the pulse generator comprises: a first counter which counts the number of pulses of a vertical sync signal, and outputs the least significant bit of the counting result; a second counter which counts the number of pulses of a horizontal sync signal, and outputs the least significant bit of the counting result; a third counter which counts the number of pulses of a pixel clock signal, and outputs the least significant bit of the counting result; a first exclusive OR gate which receives either two of the outputs of the first to third counters, to perform exclusive-OR logic operations; and a second exclusive OR gate which receives output of one of the first to third counters, that is not inputted to the first exclusive OR gate, and the result of the operations by the first exclusive OR gate, to perform exclusive-OR logic operations, and outputs the result of the operations as a 1-bit pulse signal.

According to the present invention, in addition to the same effect as achieved by the invention according to Claim 1, a 1-bit irregular pulse can be generated by simple construction. Further, a pulse signal which has increased random property of a periodic signal is generated by the first to third counters and the first and second exclusive OR gates, thereby preventing a patterned picture or the like which could be generated when a regular pulse signal is employed.

According to Claim 4 of the present invention, there is provided a signal processor comprising: a pulse generator for generating $2^M-1$ 1-bit pulse signals having average logical values that are equal to or larger than $\frac{1}{2}^M$ (M is an integral number equal to or larger than "1"), smaller than "1", and integral multiples of $\frac{1}{2}^M$; a selector for selecting one of the $2^M-1$ 1-bit pulse signals generated by the pulse generator and a signal with a logical value of "0" on the basis of a lower-M-bit signal of an N+M-bit (N is an integral number equal to or larger than "1") brightness control signal; and an N-bit adder for adding an N-bit video signal, an upper-N-bit signal of the N+M-bit brightness control signal, and the signal selected by the selector.

According to the present invention, an upper-N-bit signal of an N+M-bit brightness control signal is added to an N-bit video signal, and a signal obtained by multiplying a lower-M-bit signal of the brightness control signal by $\frac{1}{2}^M$, which is inputted as carry input, is further added thereto, thereby performing brightness adjustment on the N-bit video signal with the accuracy for N+M bits, without increasing circuit scale.

According to Claim 5 of the present invention, there is provided a signal processor comprising: a pulse generator for generating three 1-bit pulse signals having average logical values of $\frac{3}{4}$, $\frac{2}{4}$, and $\frac{1}{4}$; a selector for selecting one of the three 1-bit pulse signals generated by the pulse generator and a signal with a logical value of "0" on the basis of a lower-2-bit signal of an N+2-bit (N is an integral number equal to or larger than "1") brightness control signal; and an N-bit adder for adding an N-bit video signal, an upper-N-bit signal of the N+2-bit brightness control signal, and the signal selected by the selector.

According to the present invention, it is possible to perform brightness adjustment on an N-bit video signal with the accuracy for N+2 bits, without increasing circuit scale.

According to Claim 6 of the present invention, in the signal processor as defined in Claim 5, the pulse generator comprises: a counter which counts the number of periodic pulses, and outputs the lower 2 bits of the counting result; and plural logic gates which perform logical operations on the result of the counting by the counter, and output the three 1-bit pulse signals.

According to the present invention, in addition to the same effect as achieved by the invention according to Claim 5, a signal generator can be realized with simple construction.

Figure 1:
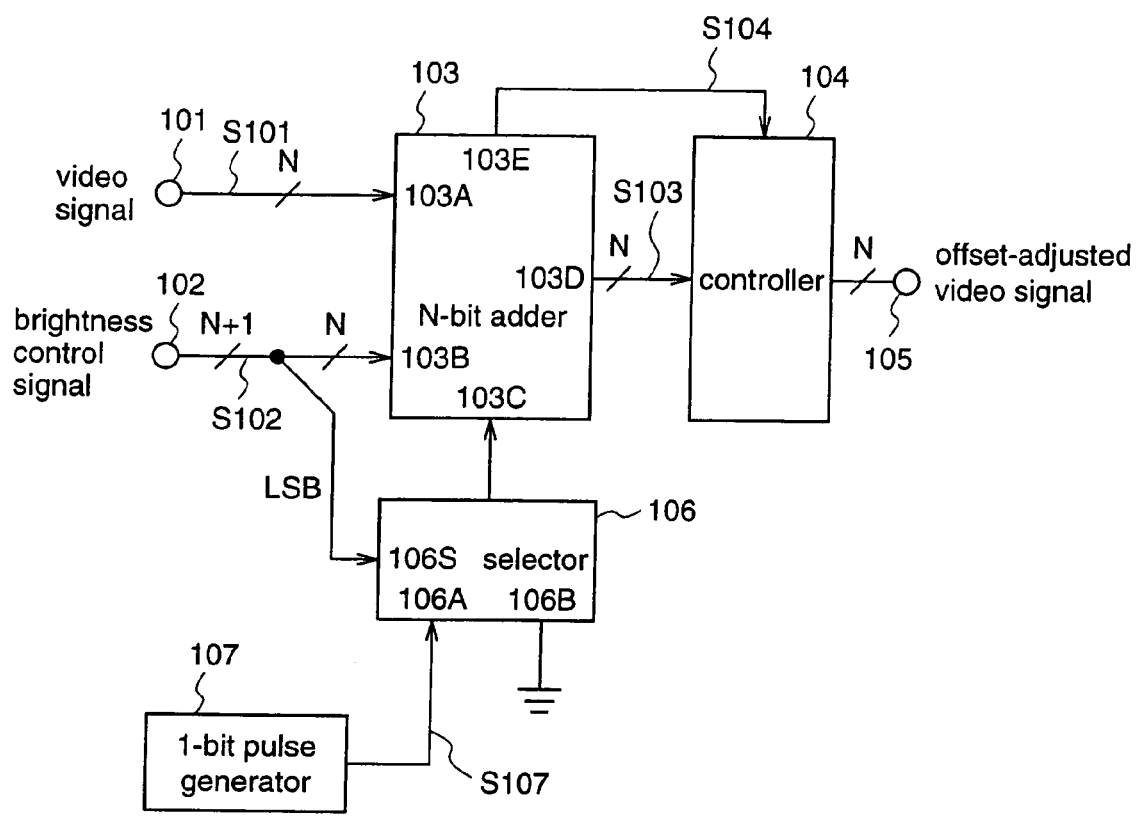
FIG. 1 is a block diagram illustrating the construction of a signal processor according to a first embodiment of the present invention.

BEST MODE TO EXECUTE THE INVENTION (Embodiment 1)

Hereinafter, a signal processor according to a first embodiment of the present invention will be described with reference to the drawing.

FIG. 1 is a block diagram illustrating the construction of the signal processor according to the first embodiment.

With reference to FIG. 1, the signal processor according to the first embodiment comprises an N-bit adder 103, a controller 104, a selector 106, and a 1-bit pulse generator 107.

The N-bit adder 103 adds an N-bit video signal S101 supplied to an input 103A, an upper-N-bit signal of an N+1-bit brightness control signal S102, which is supplied to an input 103B, and carry input supplied to an input 103C. Then, the N-bit adder 103 outputs the addition result from an output 103D as an N-bit signal S103. When overflow occurs at the addition, the N-bit adder 103 outputs an overflown 1-bit signal, that is, a signal of the most significant bit of the N+1 bits as the addition result, from a carry output 103E as a carry output signal S104, and outputs a signal of the lower N bits from the output 103D as the N-bit signal S103. Further, N is an integral number equal to or larger than "1".

The controller 104 receives the carry output signal S104 and the N-bit signal S103 from the N-bit adder 103 as input. Then, the controller 104 performs control so that the N+1-bit signal which is composed of the carry output signal S104 and the N-bit signal S103 is within a range between predetermined upper and lower limits and becomes an N-bit signal, and outputs the N-bit signal as the control result to a video signal output terminal 105.

The selector 106 selects one of signals inputted to an input 106A and an input 106B on the basis of a signal inputted to a control input 106S, and outputs the selected signal to the N-bit adder 103. Here, the input 106B of the selector 106 is grounded.

The 1-bit pulse generator 107 generates a pulse with amplitude "1", that is, logical value "1". There is a 50—50 chance that a state where the logical value of a pulse signal S107 generated by the 1-bit pulse generator 107 is "0" appears or a state where the logical value is "1" appears. That is, the pulse signal S107 outputted from the 1-bit pulse generator 107 has an average logical value of "0.5".

Next, the operation of the signal processor according to the first embodiment will be described. In the first embodiment, a description will be given particularly of a case where a luminance signal is adjusted.

The video signal S101 as an N-bit luminance signal is supplied from a video signal input terminal 101 to the input 103A of the N-bit adder 103. The N+1-bit brightness control signal S102 is inputted from a brightness control signal input terminal 102.

The brightness control signal S102 is divided into a signal of the upper N bits and a signal of the least significant bit (LSB), and the upper-N-bit signal is supplied to the input 103B of the N-bit adder 103. On the other hand, the least-significant-bit signal is supplied to the control input 106S of the selector 106 as a control signal of the selector 106.

The pulse signal S107 outputted from the 1-bit pulse generator 107 is supplied to the input 106A of the selector 106. When a signal with logical value "1" is supplied to the control input 106S of the selector 106, the selector 106 selects the signal of the input 106A, that is, the pulse signal S107, and outputs the selected signal to the N-bit adder 103.

On the other hand, when a signal with logical value "0" is supplied to the control input 106S, the selector 106 selects the signal of the input 106B, that is, a signal with logical value "0", and outputs the selected signal to the N-bit adder 103.

Accordingly, when the least significant bit of the brightness control signal S102 is "1", the output of the selector 106 is "0.5" on average. On the other hand, when the least significant bit of the brightness control signal S102 is "0", the output of the selector 106 is "0". That is, average output of the selector 106 has a value obtained by multiplying the least significant bit of the brightness control signal S102 by "0.5".

The output from the selector 106 is supplied to the input 103C of the N-bit adder 103. Then, the N-bit adder 103 adds the N-bit video signal S101 supplied to the input 103A, the upper-N-bit signal of the N+1-bit brightness control signal S102, which is supplied to the input 103B, and the 1-bit carry input supplied to the input 103C. At the addition in the N-bit adder 103, the 1-bit carry input supplied to the input 103C is added for the least significant bit.

When the brightness control signal S102 has a negative value, the brightness control signal S102 is added to the video signal S101, which results in the video signal S101 from which offset is subtracted.

Then, when the addition result is N bits, the N-bit adder 103 outputs the addition result from the output 103D as the N-bit signal S103. On the other hand, when the addition result is N+1 bits, the N-bit adder 103 outputs an overflown 1-bit signal, that is, a signal of the most significant bit of the addition result, from the output 103E as the carry output signal S104, and outputs a signal of the lower N bits from the output 103D as the N-bit signal S103.

When the controller 104 receives the N-bit signal S103 and the carry output signal S104 from the N-bit adder 103, the controller 104 performs control so that the N+1-bit signal composed of both of the above-described signals is within a range between predetermined upper and lower limits and becomes an N-bit signal. Then, the controller 104 outputs an N-bit offset-adjusted video signal as the control result to a video signal output terminal 105.

Though this offset-adjusted video signal is composed of N bits, it is obtained by performing brightness adjustment with the accuracy for N+1 bits. A description will be briefly given of the accuracy of brightness adjustment.

When the least significant bit of the brightness control signal S102 is "1", a signal of averaging "0.5" is inputted to the carry input 103C of the N-bit adder 103. For example, when a value of a signal obtained by adding the video signal S101 and the brightness control signal S102 is "10" in decimal, there is an equal chance that the output of the N-bit adder 103 is "10" or "11". Accordingly, the output of the N-bit adder 103 can be supposedly "10.5". That is, gradation of the video signal can be adjusted in 0.5 unit, so that the gradation becomes twice as high on the whole, resulting in accuracy improved by 1 bit.

As described above, according to the signal processor of the first embodiment, the N-bit adder 103 adds the N-bit video signal S101 and the upper-N-bit signal of the N+1-bit brightness control signal S102, and further adds, thereto, a signal obtained by multiplying the least-significant-bit signal of the brightness control signal S102 by "0.5", which is inputted as carry input, thereby performing brightness adjustment on the N-bit video signal S101 with the accuracy for N+1 bits, without increasing circuit scale.

While in the first embodiment the description has been given of the case where the output from the selector 106 is added at the N-bit adder 103 as carry input, the N-bit adder according to the present invention may be a 3-input adder or the like, which adds the signal from the selector 106, the N-bit video signal S101, and the upper-N-bit signal of the brightness control signal S102.

The 1-bit pulse generator 107 according to the first embodiment may generate either a periodic pulse signal or an irregular, not periodic, pulse signal.

Further, while in the first embodiment the video signal S101 is a luminance signal, the video signal according to the present invention may be other signals than the luminance signal.

(Embodiment 2)

Hereinafter, a signal processor according to a second embodiment of the present invention will be described with reference to the drawings. The signal processor according to the second embodiment is one for showing an example of the 1-bit pulse generator 107 of the first embodiment, in which a vertical sync signal, a horizontal sync signal, and a pixel clock signal are used to generate a 1-bit pulse signal.

Figure 2:
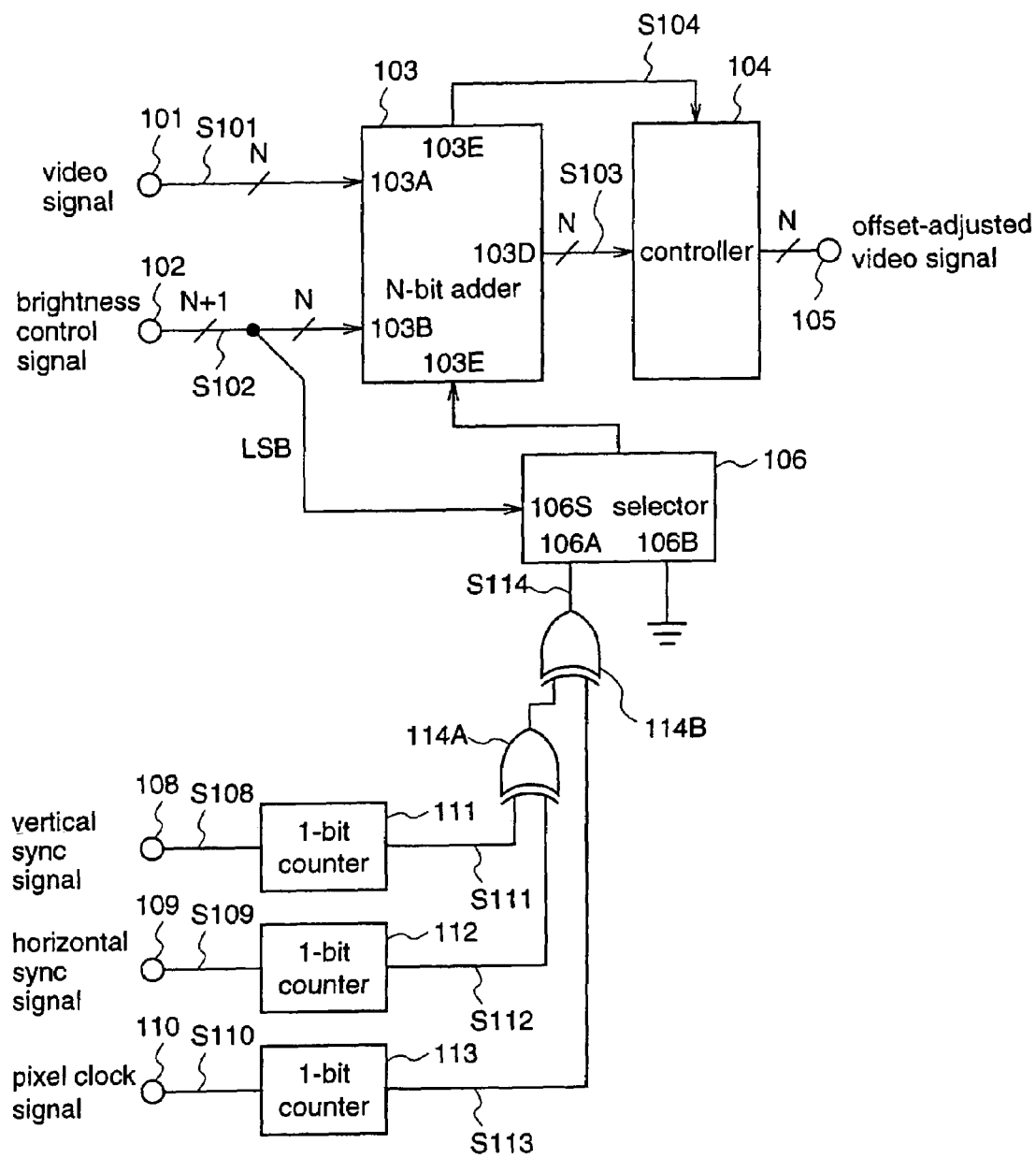
FIG. 2 is a block diagram illustrating the construction of a signal processor according to a second embodiment of the present invention.

FIG. 2 is a block diagram illustrating the construction of the signal processor according to the second embodiment.

With reference to FIG. 2, the signal processor according to the second embodiment comprises an N-bit adder 103, a controller 104, a selector 106, 1-bit counters 111, 112, and 113, and exclusive OR gates 114A and 114B. The constructions and operations of the N-bit adder 103, the controller 104, and the selector 106 are the same as those described for the first embodiment, and descriptions thereof will be omitted.

The 1-bit counter 111 receives a vertical sync signal S108 as input, counts the number of times that a vertical sync pulse is supplied, and outputs a signal of the least significant bit of the counting result as a 1-bit output signal S111. That is, the 1-bit counter 111 outputs the 1-bit output signal S111 in which "0" and "1" are alternately repeated every time the vertical sync pulse of the vertical sync signal S108 is inputted.

In the same way as the 1-bit counter 111, the 1-bit counters 112 and 113 receive a horizontal sync signal S109 and a pixel clock signal S110, respectively, as input, count the number of times that a horizontal sync pulse and a pixel clock pulse are supplied, and output signals of the least significant bits of the counting results as 1-bit outputs S112 and S113.

Next, the operation of the signal processor according to the second embodiment will be described.

Initially, the vertical sync signal S108 is supplied from a vertical sync signal input terminal 108 to the 1-bit counter 111. Then, the 1-bit output signal S111 is outputted from the 1-bit counter 111.

Likewise, the horizontal sync signal S109 and the pixel clock signal S110 are supplied from a horizontal sync signal input terminal 109 and a pixel clock signal input terminal 110 to the 1-bit counters 112 and 113, respectively, and the 1-bit output signals S112 and S113 are outputted from the 1-bit counters 112 and 113.

The three 1-bit output signals S111, S112, and S113 outputted from the three 1-bit counters 111, 112, and 113 are subjected to logical operations by the two exclusive OR gates 114A and 114B, and a signal obtained by the logical operations is supplied to the input terminal 106A of the selector 106. The logical operations here are performed as follows: an exclusive OR between the two 1-bit output signals S111 and S112 is initially obtained by the exclusive OR gate 114A, and an exclusive OR between an output signal of the exclusive OR gate 114A and the 1-bit output signal S113 is further obtained by the exclusive OR gate 114B.

A 1-bit pulse signal S114 outputted from the exclusive OR gate 114B is supplied to the input 106A of the selector 106. The operation hereafter is the same as that described for the first embodiment, and a description thereof will be omitted.

Figure 3:
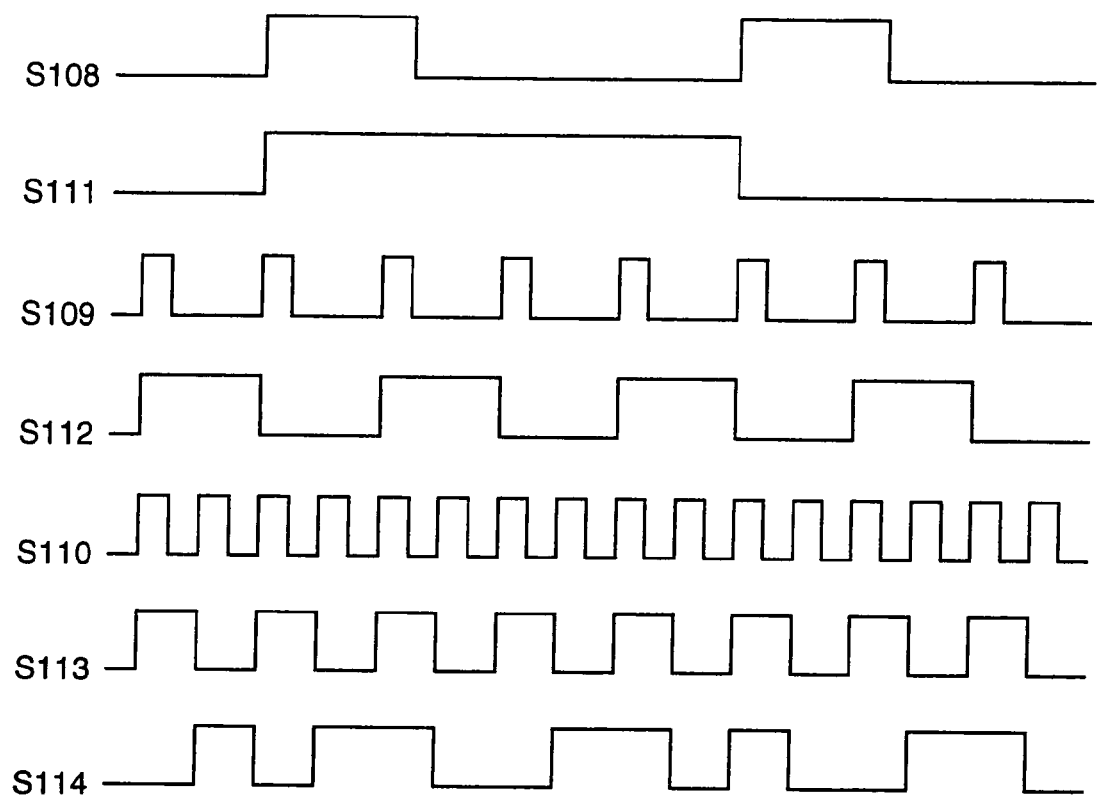
FIG. 3 is a waveform chart for explaining the operation of the signal processor according to the second embodiment.

FIG. 3 is a waveform chart illustrating variations of the respective signals of the signal processor according to the second embodiment.

As shown in FIG. 3, in the 1-bit output signals S111, S112, and S113 which are obtained by counting the pulses of the vertical sync signal S108, the horizontal sync signal S109, and the pixel clock signal S110, respectively, states where a logical value is "1" and where the logical value is "0" alternately and periodically appear. Thus, it is possible to consider that each of the 1-bit counters 111, 112, and 113 outputs a signal with average logical value of "0.5". Further, by performing the above-described logical operations employing exclusive OR on the 1-bit output signals S111, S112, and S113, irregular property is added to the appearance of "1" and "0". Accordingly, the 1-bit pulse signal S114 outputted from the exclusive OR gate 114B is an irregular pulse signal. When this signal S114 is treated as output of the 1-bit pulse generator 107 of the first embodiment, also in this second embodiment, offset adjustment of the video signal S101 can be performed with the accuracy for N+1 bits as in the first embodiment.

As described above, the signal processor according to the second embodiment are provided with the 1-bit counters 111, 112, and 113, which count pulses of the vertical sync signal S108, the horizontal sync signal S109, and the pixel clock signal S110, respectively, and the exclusive OR gates 114A and 114B which perform logical operations on the outputs of the 1-bit counters 111, 112, and 113, so as to output the 1-bit pulse signal S114. Therefore, in addition to the same effect as achieved by the first embodiment, the 1-bit pulse signal S114 can be generated by a simple construction.

Further, the 1-bit pulse signal S114 which has increased the random property of the periodic signal is generated by the 1-bit counters 111, 112, and 113, and the exclusive OR gates 114A and 114B, thereby preventing a patterned picture or the like which could be generated when a regular 1-bit pulse signal is employed.

While in the second embodiment, among the three 1-bit output signals S111, S112, and S113, the two 1-bit output signals S111 and S112 are inputted to the exclusive OR gate 114A, and the other 1-bit output signal S113 is inputted to the exclusive OR gate 114B, the combination of the two 1-bit output signals to be inputted to the exclusive OR gate 114A and the other 1-bit output signal to be inputted to the exclusive OR gate 114B, among the three 1-bit output signals S111, S112, and S113 is not restricted to that described in the second embodiment.

Further, while in the second embodiment the three 1-bit counters are provided, the number of 1-bit counters is not restricted to three. For example, one, two, four or more 1-bit counters may be provided. When four 1-bit counters are provided, there are provided a first exclusive OR gate which obtains an exclusive OR between outputs from either two of the four 1-bit counters, a second exclusive OR gate which obtains an exclusive OR between the exclusive OR obtained by the first exclusive OR gate and output from another 1-bit counter, and a third exclusive OR gate which obtains an exclusive OR between the exclusive OR obtained by the second exclusive OR gate and output from the remaining 1-bit counter, and output of the third exclusive OR gate is regarded as the 1-bit pulse signal S114.

Or, there may be provided a first exclusive OR gate which obtains an exclusive OR between outputs of either two of the four 1-bit counters, a second exclusive OR gate which obtains an exclusive OR between outputs of the other two 1-bit counters, and a third exclusive OR gate which obtains an exclusive OR between outputs of both of the first and second exclusive OR gates, and output of the third exclusive OR gate is regarded as the 1-bit pulse signal S114.

Further, in the second embodiment the three signals, the vertical sync signal S108, the horizontal sync signal S109, and the pixel clock signal S110 are used to generate the 1-bit pulse signal S114. However, even when at least one of the three signals is used, and a signal obtained by performing counting on the above-described signal with the 1-bit counter is supplied to the input 106A of the selector 106, a signal obtained by multiplying the least-significant-bit signal of the brightness control signal S102 by "0.5" is supplied to the carry input of the N-bit adder 103, thereby enabling offset adjustment of the video signal S101 with the accuracy for N+1 bits.

Furthermore, while in the second embodiment the signals inputted to the 1-bit counters 111, 112, and 113 are the vertical sync signal S108, the horizontal sync signal S109, and the pixel clock signal S110, they may be other periodic signals than described above.

(Embodiment 3)

Hereinafter, a signal processor according to a third embodiment of the present invention will be described with reference to the drawing.

Figure 4:
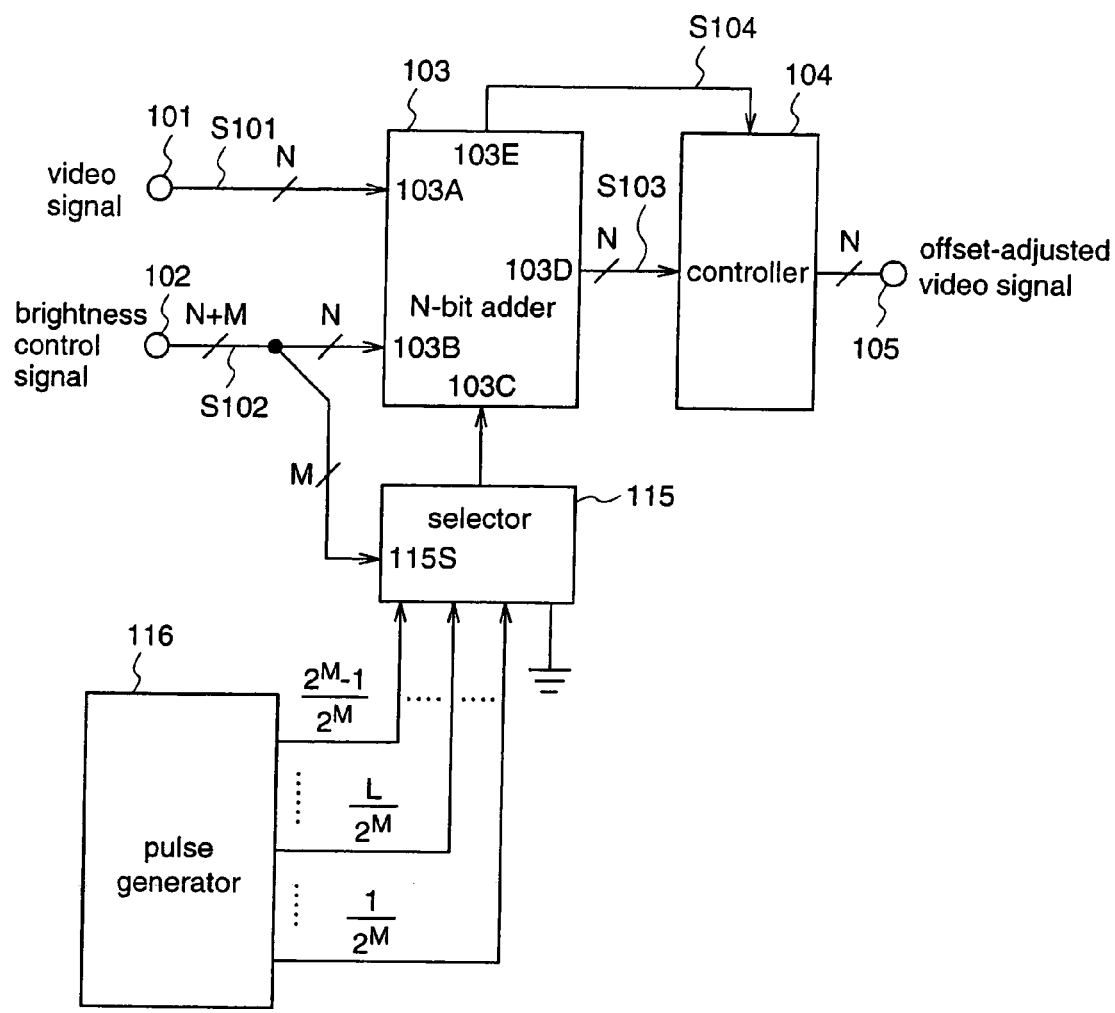
FIG. 4 is a block diagram illustrating the construction of a signal processor according to a third embodiment of the present invention.

FIG. 4 is a block diagram illustrating the construction of the signal processor according to the third embodiment.

With reference to FIG. 4, the signal processor according to the third embodiment comprises an N-bit adder 103, a controller 104, a selector 115, and a pulse generator 116. The constructions and operations of the N-bit adder 103 and the controller 104 are the same as those described for the first embodiment, and descriptions thereof will be omitted.

The selector 115 selects one from $2^M$ input signals on the basis of an M-bit control signal, and outputs the selected signal to the N-bit adder 103. Here, one of inputs of the selector 115 is grounded. Further, M is an integral number equal to or larger than "1".

The pulse generator 116 generates all pulse signals having logical values which become "1" in an arbitrary period at the rate of $\frac{1}{2}^M$ and more, $(2^M-1)/2^M$ and less, and $\frac{1}{2}^M$ and its integral multiples, and outputs the generated pulse signals to the selector 115. The pulse signal having a logical value which becomes "1" in an arbitrary period at the rate of $\frac{1}{2}^M$ is regarded as a signal with an average logical value "$\frac{1}{2}^M$". The pulse signal having a logical value which becomes "1" in an arbitrary period at the rate L times as high as $\frac{1}{2}^M$ is regarded as a signal with an average logical value "$L/2^M$". Accordingly, it is regarded that the pulse generator 116 outputs $2^M-1$, in total, pulse signals having average logical values equal to or larger than $\frac{1}{2}^M$ and smaller than "1", in $\frac{1}{2}^M$ unit, to supply to the selector 115. Further, since one of the input terminals of the selector 115 is grounded, it is regarded that $2^M$ signals having average logical values that are equal to or larger than "0", smaller than "1", and integral multiples of $\frac{1}{2}^M$ are supplied to the selector 115.

Next, the operation of the signal processor according to the third embodiment will be described.

Initially, an N-bit video signal S101 is supplied from a video signal input terminal 101 to the input 103A of the N-bit adder 103. An N+M-bit brightness control signal S102 is inputted from a brightness control signal input terminal 102.

The brightness control signal S102 is divided into a signal of the upper N bits and a signal of the lower M bits, and the upper-N-bit signal is supplied to the input 103B of the N-bit adder 103. On the other hand, the lower-M-bit signal is supplied to the control input 115S of the selector 115 as a control signal of the selector 115.

The $2^M-1$ pulse signals outputted from the pulse generator 116 are supplied to the selector 115. The control signal as the lower-M-bit signal of the brightness control signal S102 has an integral value ranging from "0" to "$2^M-1$" in decimal expression. When the decimal expression of this control signal is K, the selector 115 selects a signal having an average logical value K times as large as $\frac{1}{2}^M$, from the inputs from the pulse generator 116 and from the grounded input, and outputs the selected signal to the carry input 103C of the N-bit adder 103. Thus, the carry input 103C of the N-bit adder 106 is supplied with a signal obtained by multiplying the lower-M-bit signal of the brightness control signal S102 by $\frac{1}{2}^M$. The operation hereafter is the same as that described for the first embodiment, and a description thereof will be omitted.

As described above, according to the signal processor of the third embodiment, an upper-N-bit signal of the N+M-bit brightness control signal S102 is added to the N-bit video signal S101, and a signal obtained by multiplying a lower-M-bit signal of the brightness control signal S102 by $\frac{1}{2}^M$, which is inputted as carry input, is further added thereto, thereby performing brightness adjustment on the N-bit video signal S101 with the accuracy for N+M bits, without increasing circuit scale.

The $2^M-1$ pulse signals generated by the pulse generator 116 according to the third embodiment may be either periodic pulse signals or irregular, not periodic, pulse signals.

(Embodiment 4)

Hereinafter, a signal processor according to a fourth embodiment of the present invention will be described with reference to the drawings. The signal processor according to the fourth embodiment is one for showing an example where a value of M in the third embodiment is "2", and is provided with a 2-bit counter and logic gates as the pulse generator 116.

Figure 5:
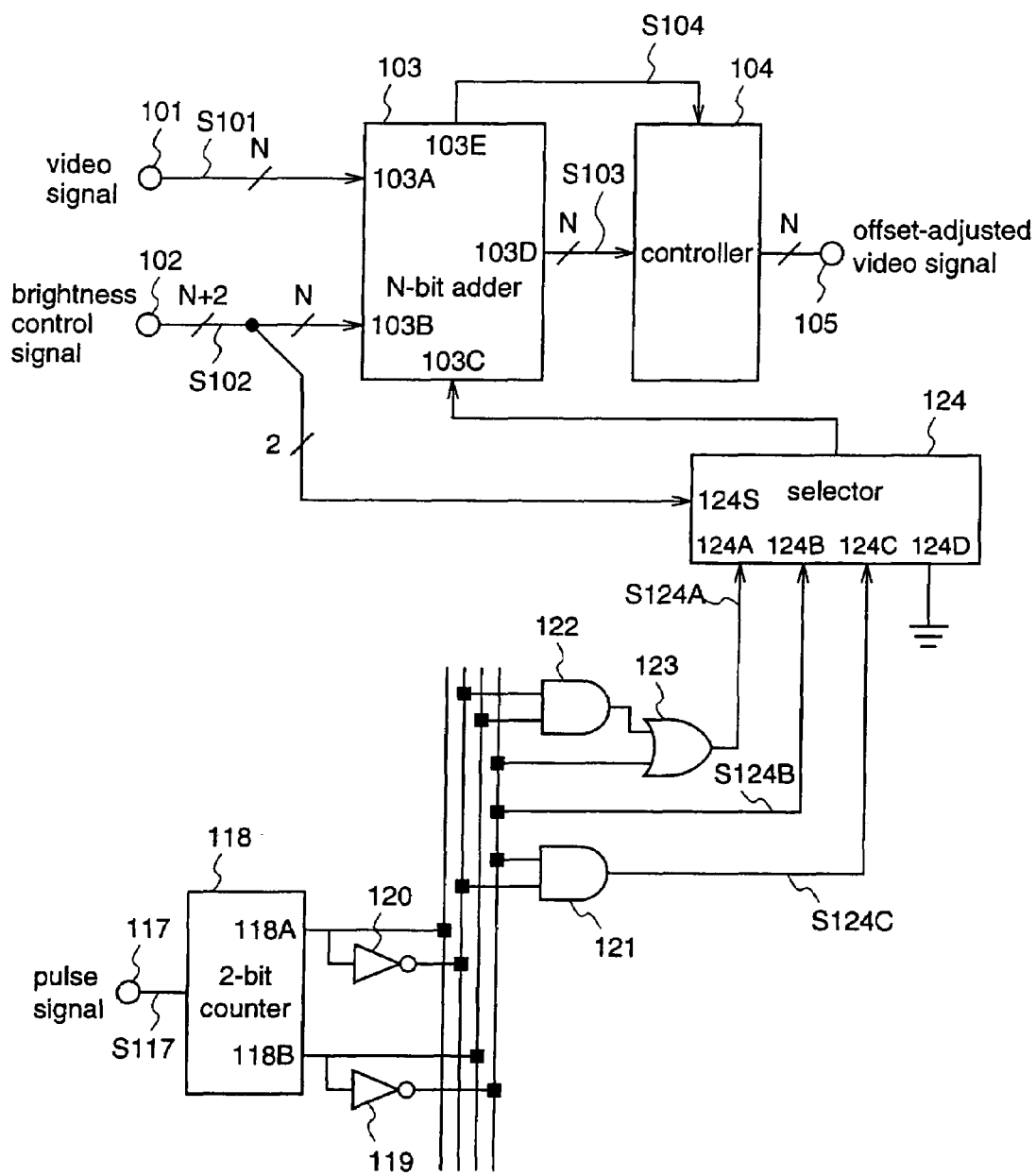
FIG. 5 is a block diagram illustrating the construction of a signal processor according to a fourth embodiment of the present invention.

FIG. 5 is a block diagram illustrating the construction of the signal processor according to the fourth embodiment.

With reference to FIG. 5, the signal processor according to the fourth embodiment comprises an N-bit adder 103, a controller 104, a 2-bit counter 118, logical negation gates 119 and 120, AND gates 121 and 122, an OR gate 123, and a selector 124. The constructions and operations of the N-bit adder 103 and the controller 104 are the same as those described for the first embodiment, and descriptions thereof will be omitted.

The 2-bit counter 118 receives a pulse signal S117 as input, counts the number of times that the pulse signal S117 changes to "1", and outputs the lower 2 bits of this counted value (hereinafter, referred to as a "counted value"). That is, the 2-bit counter 118 repeatedly and sequentially outputs four kinds of counted values, "0", "1", "2", and "3".

The selector 124 selects one of signals inputted to inputs 124A, 124B, 124C, and 124D by a 2-bit signal inputted to a control terminal 124S, and outputs the selected signal to the N-bit adder 103.

Next, the operation of the signal processor of the fourth embodiment will be described.

Initially, the pulse signal S117 is supplied from a pulse signal input terminal 117 to the 2-bit counter 118. Then, a counted value is outputted from the 2-bit counter 118. Of the 2 bits of counted value, the upper bit is outputted from an output 118A and the lower bit is outputted from an output 118B. Here, as the pulse signal S117, a periodic pulse signal such as the vertical sync signal, the horizontal sync signal, and the pixel clock signal as described in the second embodiment is employed.

The counted value is subjected to logical operations by the logic gates 119 to 123, and signals obtained as the results of logical operations, S124A, S124B, and S124C are supplied to input terminals 124A, 124B, and 124C of the selector 124, respectively.

To be specific, the signal from the output 118A of the 2-bit counter 118 is inverted by the logical negation gate 120, and the inverted signal is inputted to the AND gates 121 and 122. The signal from the output 118B is inputted to the AND gate 122. Further, a signal obtained by inverting the signal from the output 118B with the logical negation gate 119 is inputted to the AND gate 121 and the OR gate 123, and is further supplied to the input 124B of the selector 124 as the signal S124B. An AND obtained by the AND gate 121 is inputted to the input 124C of the selector 124 as the signal S124C. An AND obtained by the AND gate 122 is inputted to the OR gate 123, and an OR obtained by the OR gate 123 is inputted to the input 124A of the selector 124 as the signal S124A.

Figure 6:
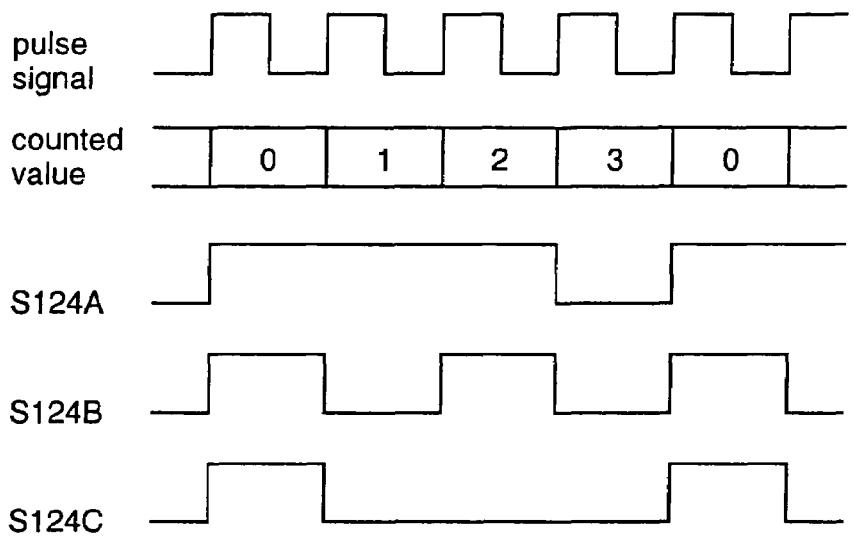
FIG. 6 is a waveform chart for explaining the operation of the signal processor according to the fourth embodiment.
Figure 7:
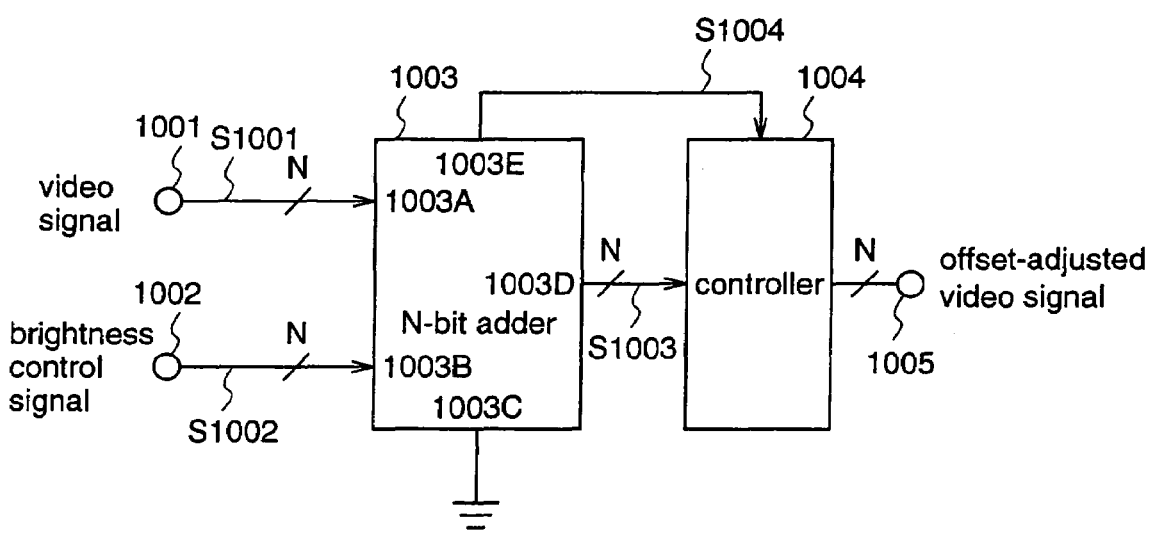
FIG. 7 is a block diagram illustrating the construction of a conventional signal processor.

FIG. 6 is a waveform chart illustrating variations of the respective signals of the signal processor according to the fourth embodiment.

As shown in FIG. 6, the 2-bit counter 118 outputs a counted value obtained by counting the number of times that the pulse signal S117 changes to "1". The signals S124A, S124B, and S124C obtained as the results of logical operations by the logic gates 119 to 123, which are supplied to the input terminals 124A, 124B, and 124C vary as shown in FIG. 6. That is, a logical value of the signal S124A becomes "1" when the counted value is other than "3", a logical value of the signal S124B becomes "1" when the counted value is "0" or "2", and a logical value of the signal S124C becomes "1" only when the counted value is "0".

As described above, the counted value has four kinds of values, each having ¼ chance of appearing. When attention is focused on the respective signals supplied to the selector 124, for example, the logical value of the signal S124C becomes "1" at the time of one counted value among the four counted values. That is, a period during which the logical value of the signal S124C is "1" corresponds to a quarter of the total. Thus, the signal S124C is regarded to have an average logical value of "0.25".

Likewise, the logical value of the signal S124B becomes "1" in two-fourths of the whole period, and thus the signal S124B is regarded to have an average logical value of "0.5". The logical value of the signal S124A becomes "1" in three-fourths of the whole period, and thus the signal S124A is regarded to have an average logical value of "0.75".

Since the remaining input terminal 124D of the selector 124 is grounded, the selector 124 receives the four signals having the average logical values of "0", "0.25", "0.5", and "0.75", selects either one of these signals by a control signal, and supplies the selected signal to the carry input 103C of the N-bit adder 103.

As described above, a lower-2-bit signal of an N+2-bit brightness control signal S102 is supplied as the control signal of the selector 124, and this 2-bit signal indicates values "0" to "3". When the value is "0", "1", "2", or "3", the selector 124 selects and outputs the signal having the average logical value of "0", "0.25", "0.5", or "0.75", respectively. Therefore, the carry input 103C of the N-bit adder 103 is supplied with a signal having a value obtained by multiplying the lower 2 bits of the brightness control signal S102 by "0.25". The operation hereafter is the same as that described for the first embodiment, and a description there of will be omitted.

As described above, according to the signal processor of the fourth embodiment, the upper-N-bit signal of the N+2-bit brightness control signal S102 is added to the N-bit video signal S101, and a signal obtained by multiplying a lower-2-bit signal of the brightness control signal S102 by "0.25", which is inputted as carry input, is further added thereto, thereby performing brightness adjustment on the N-bit video signal S101 with the accuracy for N+2 bits, without increasing circuit scale.

Further, the 2-bit counter 118 which counts a pulse of the pulse signal S117 to output a 2-bit counted value, and the logic gates 119 to 123 which performs logical operations on the 2-bit counted value to supply the signals S124A, S124B, and S124C to the selector 124 are provided, thereby realizing the pulse generator 116 of the third embodiment with simple construction.

While in the above-described respective embodiments, in the signal processor according to the present invention, the controller 104 places restrictions on the output from the N-bit adder 103, the signal processor according to the present invention does not need to have the controller 104 when the offset-adjusted video signal may be an N+1-bit signal. In this case, the N+1-bit signal composed of the N-bit signal S103 from the N-bit adder 103 and the 1-bit carry output signal S104 is an offset-adjusted video signal.

APPLICABILITY IN INDUSTRY

As described above, a signal processor according to the present invention is suited for a signal processor which performs brightness adjustment of a video signal by adding a brightness control signal as an offset value to the video signal.

What is claimed is:

1. A signal processor comprising:
   a pulse generator for generating a 1-bit pulse signal having an average logical value of "½";
   a selector for selecting either the pulse signal or a signal having a logical value of "0" on the basis of a least-significant-bit signal of an N+1-bit (N is an integral number equal to or larger than "1") brightness control signal; and
   an N-bit adder for adding an N-bit video signal, an upper-N-bit signal of the N+1-bit brightness control signal, and the signal selected by the selector.

2. The signal processor as defined in claim 1, wherein the pulse generator comprises:
   plural counters each of which counts the number of pulses of a periodic signal, and outputs the least significant bit of the counting result; and
   a single or plural exclusive OR gates which obtain exclusive OR between the outputs of the plural counters to output as a 1-bit pulse signal.

3. The signal processor as defined in claim 1, wherein the pulse generator comprises:
   a first counter which counts the number of pulses of a vertical sync signal, and outputs the least significant bit of the counting result;
   a second counter which counts the number of pulses of a horizontal sync signal, and outputs the least significant bit of the counting result;
   a third counter which counts the number of pulses of a pixel clock signal, and outputs the least significant bit of the counting result;
   a first exclusive OR gate which receives either two of the outputs of the first to third counters, to perform exclusive-OR logic operations; and
   a second exclusive OR gate which receives output of one of the first to third counters, that is not inputted to the first exclusive OR gate, and the result of the operations by the first exclusive OR gate, to perform exclusive-OR logic operations, and outputs the result of the operations as a 1-bit pulse signal.

4. A signal processor comprising:
   a pulse generator for generating $2^M-1$-bit pulse signals having average logical values that are equal to or larger than $\frac{1}{2}^M$ (M is an integral number equal to or larger than "1"), smaller than "1", and integral multiples of $\frac{1}{2}^M$;
   a selector for selecting one of the $2^M-1$ 1-bit pulse signals generated by the pulse generator and a signal with a logical value of "0" on the basis of a lower-M-bit signal of an N+M-bit (N is an integral number equal to or larger than "1") brightness control signal; and
   an N-bit adder for adding an N-bit video signal, an upper-N-bit signal of the N+M-bit brightness control signal, and the signal selected by the selector.

5. A signal processor comprising:
   a pulse generator for generating three 1-bit pulse signals having average logical values of ¾, ²⁄₄, and ¼;
   a selector for selecting one of the three 1-bit pulse signals generated by the pulse generator and a signal with a logical value of "0" on the basis of a lower-2-bit signal of an N+2-bit (N is an integral number equal to or larger than "1") brightness control signal; and
   an N-bit adder for adding an N-bit video signal, an upper-N-bit signal of the N+2-bit brightness control signal, and the signal selected by the selector.

6. The signal processor as defined in claim 5, wherein the pulse generator comprises:
   a counter which counts the number of periodic pulses, and outputs the lower 2 bits of the counting result; and
   plural logic gates which perform logical operations on the result of the counting by the counter, and output the three 1-bit pulse signals.

* * * * *